UNITED STATES PATENT OFFICE.

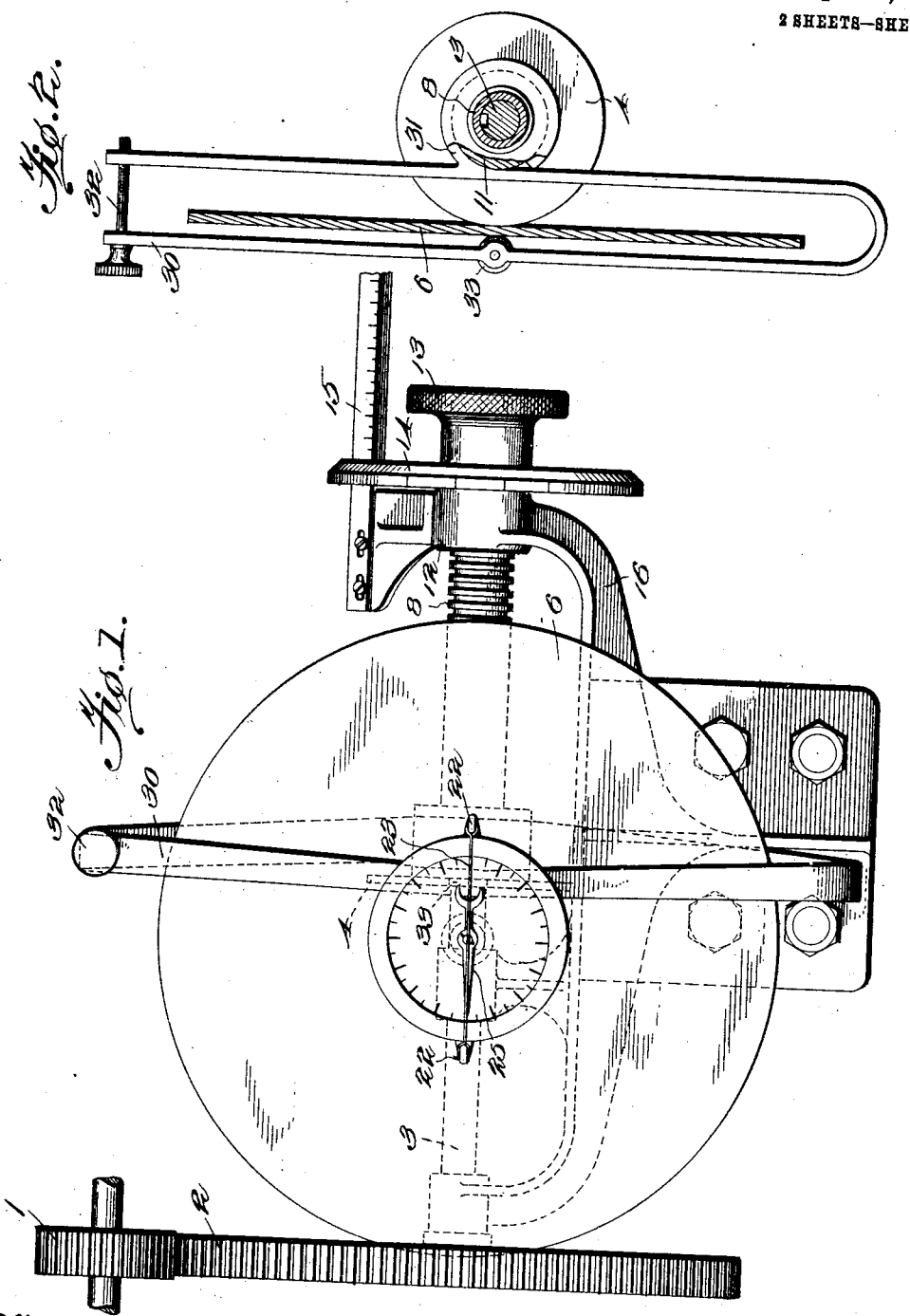

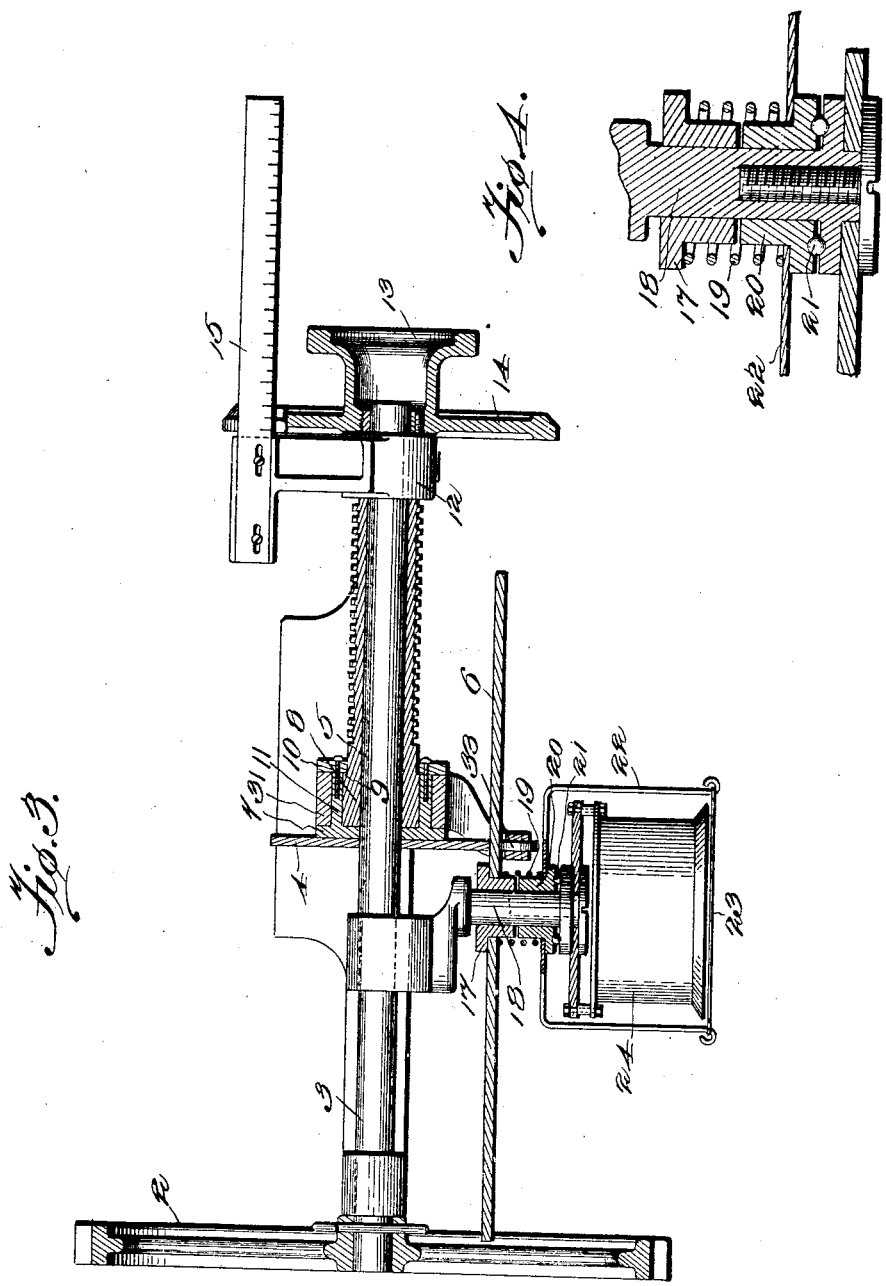

LOUIS A. KAISER, OF THE UNITED STATES NAVY.

SPEED-INDICATOR.

955,081.  Specification of Letters Patent.  Patented Apr. 12, 1910.

Application filed July 1, 1909. Serial No. 505,468.

*To all whom it may concern:*

Be it known that I, LOUIS A. KAISER, lieutenant commander U. S. Navy, a citizen of the United States, stationed at Washington, in the District of Columbia, have invented certain new and useful Improvements in Speed-Indicators; and I do hereby declare the following to be a full, clear, and exact description of the invention, such as will enable others skilled in the art to which it appertains to make and use the same.

This invention relates to speed indicators, and has for its object the production of a simple and comparatively inexpensive device of this nature, which will be capable of easy adjustment for the measurement or the indication of various speeds; and when for any cause the indications are not correct will be capable of easy correction or readjustment so as to indicate the proper speed.

With these ends in view the invention consists in the novel details of construction and combinations of parts more fully hereinafter disclosed and particularly pointed out in the claims.

Referring to the accompanying drawings forming a part of this specification in which like numerals refer to like parts in all the views:—Figure 1 is an elevational view of one form of my invention; Fig. 2, a sectional view taken along a vertical plane passing through the central portion of Fig. 1, and showing certain portions of the invention only but showing the U-shaped spring in elevation; Fig. 3, is a sectional view taken at right angles to the plane on which Fig. 2 is taken and also showing only certain portions of the invention; and, Fig. 4, a sectional view of a detail of the connections between the clock support and the indicating index.

1 represents any rotating or moving part, the speed of which is to be measured; 2 any suitable gear connecting therewith; 3 a shaft to which the gear 2 is rigidly secured; 4 a driving disk splined to the shaft 3, as indicated by the dotted line 5 in Fig. 3, and 6 a suitable driven disk with which the disk 4 frictionally engages. The disk 4 is mounted on a suitable cup-shaped flange disk 7, into which fits the screw threaded sleeve 8 having the shoulder 9 against which fits the ring 10 secured to the flange 11 of the disk 7. The structure is such that the sleeve 8 may freely rotate within the flange 11 and cause the same with the disk 4 to traverse the shaft 3. The screw threaded sleeve 8 passes through the fixed nut 12, and is secured to the thumb piece 13 provided with the enlarged graduated disk 14 adapted to traverse in a longitudinal direction the scale 15. Said scale, together with the nut 12, is preferably rigid with the support 16. The friction disk 6 is rigid with the sleeve 17 mounted on the support 18, and is provided with a suitable flexible connection, such as the coiled spring 19 with the disk 20 which is also mounted on the support 18, and is provided with the ball bearings 21. The flexible connection 19 frictionally surrounds the sleeve 20 and is suitably connected as by friction to the index support 22, which may be in the form of U-shaped arms, as shown, and across the outer ends of these arms is preferably stretched an index filament 23 which may be of wire, thread, or even a rubber band.

A suitable clock 24 is rigidly mounted on the support 18, and is provided preferably with a single hand 25 which may be given any speed of rotation desired.

In operating speed measures of this character, especially over long periods of time, and under trying conditions, it is very difficult indeed to get a practical contact between the edge of the disk 4, and the surface of the disk 6, which will not soon become worn and thereby cause inaccuracies in the indication of the speed. Especially is the problem aggravated when the disk 4 contacts with the outer face of the disk 6 and thereby presses against the same with an increased leverage. In order to obviate difficulties of this nature, as well as to cure other defects that are familiar to those who are accustomed to operating speed indicators, I provide the U-shaped spring 30 having a suitable supporting attachment 31 which may conveniently surround the flange 11 of the disk 7, or it may be supported from any other suitable moving part of the mechanism. This spring extends upwardly from the shaft 3 above the edge of the disk 6, and passes down below the opposite edge thereof on one side, as indicated. It then passes up on the other side of said disk and finally its upper end terminates opposite its first end, as best shown in Fig. 2. An adjusting screw 32 passes through the two ends and serves to control the tension of the spring. Near the middle of the last mentioned leg of the U-shaped spring there is preferably provided a roller 33, which presses firmly against the surface of the disk 6, and on the side of said disk opposite that against which the edge of the disk 4 presses, as best shown in Fig. 3. In other words, it is clear that the roller 33 serves as a cushioned support to take the pressure of the disk 4. It is furthermore clear that as the sleeve 8 traverses the shaft 3 the said roller 33 will also traverse radially the surface of the disk 6, and thereby always constitute an efficient support for said disk 6.

The operation of my speed indicator is as follows:—Supposing power to be applied to the gear 1, it is transmitted to the gear 2, to the shaft 3, to the disk 4, to the disk 6, sleeve 17, spring 19, sleeve 20, and to the index support 22 which frictionally fits between the spring 19 and the sleeve 20, and therefore is capable of an adjustment independent of these parts. It is evident therefore that the rotation of the index 23 will bear an accurate relation to the rotation of the gear 1. It is also evident that if the thumb piece 13 is turned to move the disk 4 radially of the disk 6, the rotation of the said filament 23 may be made to bear any desired relation with the rotation of the gear 1. In other words, if the clock hand 25 indicates seconds, and if the index 23 through the adjustment of the disk 4 is made to rotate accurately with the hand 25, it is known at once just how many revolutions per second a given part of the machine being tested makes.

In setting the instrument, since the index support 22 is only frictionally secured to the sleeve 20, it may be readily turned by hand until the filament 23 accurately registers with the hand 25. If then after watching the operation a few minutes the index 23 gains or loses on the hand 25, the thumb piece 13 is suitably turned until the speed of the said index and of the clock hand are accurately equal. When this is found to be the case the micrometer scale 14, 15, will indicate at once the actual number of rotations being made by the rotating part whose speed is being measured. If after watching the operation of the speed indicator for some time it is found to show inaccuracies, then the screw 32 may be tightened which will give a firm and yielding grip between the disks 4 and 6 and the accuracy of the instrument will be at once restored.

It is evident that the device is capable of indicating a wide range of speed, and that it is capable of a wide and extended use. In fact, since the parts may be made as large or as small as desired, it is evident that this device is capable of use on practically any kind of machinery, the speed of one or more parts of which it is desired to measure. It is also evident that the construction shown in the drawings need not be accurately followed for the same principles may be embodied in a wide variety of mechanism. In fact since those skilled in the art may readily change the arrangement of parts and details of construction without departing from the spirit of the invention, I do not wish to be limited to the details shown, except as may be required by the claims.

What I claim is:—

1. In a speed indicator, the combination of a source of power; a shaft driven thereby; a driving disk splined on the shaft; means for adjusting said disk longitudinally of the shaft; a driven disk in frictional engagement with the driving disk; a clock provided with a hand; an index adapted to rotate concentric with said hand; connections between said index and said driven disk; and resilient means for increasing the friction between said disks, substantially as described.

2. In a speed indicator, the combination of a source of power; a shaft receiving said power; a driving disk mounted on the shaft; a driven disk in frictional engagement on one of its sides with the driving disk; means on the other side of said driven disk for increasing the friction between said driving and driven disks; a clock; an index adapted to move over the clock face; and a frictional spring connection between said index and said driven disk, substantially as described.

3. In a speed indicator, the combination of a source of power; a shaft receiving said power; a driving disk mounted on the shaft; a driven disk in frictional engagement with the driving disk; a clock; an index adapted to move over the clock face; and a frictional connection comprising a sleeve and a spring between said index and said driven disk, substantially as described.

4. In a speed indicator, the combination of a driving disk; a driven disk in frictional engagement on one of its sides therewith; and an adjustable spring pressed brace for said driven disk contacting with its other side and adapted to render constant the friction between said disks, substantially as described.

5. In a speed indicator, the combination of a driving disk; a driven disk in frictional engagement therewith; and a spring pressed support for said driven disk, comprising an adjustable U-shaped spring and a roller, adapted to render constant the friction between said disks, substantially as described.

6. In a speed indicator, the combination of a driving disk; a driven disk in frictional engagement with the driving disk; means for adjusting the driving disk radially of the driven disk; a U-shaped spring provided with a roller adapted to control the friction between said disks; an index; and means by which the same may be operated from said driven disk; substantially as described.

7. In a speed indicator, the combination of a driving disk; a driven disk in frictional engagement with the driving disk; means for adjusting the driving disk radially of the driven disk; means provided with a scale for measuring said adjustment; a U-shaped spring provided with a roller adapted to control the friction between said disks; means for adjusting the pressure of said spring; an index operated from said driven disk; and a frictional connection between said driven disk and said index, substantially as described.

8. In a speed indicator, the combination of a source of power; a shaft operated therefrom; a driving disk splined on the shaft; means for adjusting said disk longitudinally of the shaft; means provided with a scale for indicating said adjustment; a driven disk in frictional engagement with said driving disk; a spring provided with a roller contacting with said driven disk to render constant the friction between said disks; a sleeve; a spring connection between said driven disk and sleeve; a clock; an index playing over the clock; and a frictional connection between said index and said sleeve, substantially as described.

9. In a speed indicator, the combination of a source of power; a shaft driven thereby; a driving disk adapted to be adjusted longitudinally of said shaft; a driven disk in frictional engagement on one of its sides with the driving disk; and means for supporting said driven disk on its other side and opposite the points of contact between said driving and driven disks; substantially as described.

In testimony whereof, I affix my signature, in presence of two witnesses.

LOUIS A. KAISER.

Witnesses:
S. WHITFORD,
A. W. NEALE, Jr.